(12) United States Patent
Henkel et al.

(10) Patent No.: US 7,852,263 B2
(45) Date of Patent: Dec. 14, 2010

(54) METHOD FOR TRANSMITTING SATELLITE DATA

(75) Inventors: Patrick Henkel, Emmering (DE);
Christoph Guenther, Wessling (DE)

(73) Assignee: Technische Universitaet Muenchen (DE)

( * ) Notice: Subject to any disclaimer, the term of this patent is extended or adjusted under 35 U.S.C. 154(b) by 0 days.

(21) Appl. No.: 12/349,241

(22) Filed: Jan. 6, 2009

(65) Prior Publication Data
US 2009/0195451 A1    Aug. 6, 2009

Related U.S. Application Data

(63) Continuation of application No. PCT/EP2007/056781, filed on Jul. 4, 2007.

(30) Foreign Application Priority Data

Jul. 6, 2006   (DE) .................. 10 2006 031 236

(51) Int. Cl.
*G01S 19/02* (2010.01)
*G01S 19/05* (2010.01)
(52) U.S. Cl. .................. 342/357.395; 342/357.42
(58) Field of Classification Search .......... 342/357.01, 342/357.15, 357.42, 357.395
See application file for complete search history.

(56) References Cited

U.S. PATENT DOCUMENTS

| 4,445,118 | A | | 4/1984 | Taylor et al. | |
|---|---|---|---|---|---|
| 5,999,125 | A | * | 12/1999 | Kurby | 342/357.1 |
| 6,067,045 | A | * | 5/2000 | Castelloe et al. | 342/357.09 |
| 6,671,620 | B1 | | 12/2003 | Garin et al. | |
| 6,674,398 | B2 | * | 1/2004 | Murphy | 342/357.01 |
| 6,720,915 | B2 | * | 4/2004 | Sheynblat | 342/357.05 |
| 2005/0015200 | A1 | | 1/2005 | Longhurst et al. | |
| 2006/0082498 | A1 | | 4/2006 | Pitt et al. | |

FOREIGN PATENT DOCUMENTS

DE   19731702 A1   4/2009

OTHER PUBLICATIONS

"Aufbau des Datensignals: Cold-, Warm- und Hot-Start", in German, available online: http://www.kowoma.de/gps/Signalaufbau.htm; Mar. 14, 2009; 3 pages.
Zandbergen, R.; Dinwiddy, S.; Hahn, J.; Breeuwer, E. and Blonski, D.: "Galileo Orbit Selection", ION GNSS 17th International Technical Meeting of the Satellite Division, Sep. 2004, Long Beach, CA; 8 pages.

(Continued)

*Primary Examiner*—Gregory C Issing
(74) *Attorney, Agent, or Firm*—St. Onge Steward Johnston & Reens LLC

(57) ABSTRACT

In a method for transmitting satellite data of a global navigation satellite system each satellite transmit position data of neighboring satellites to a navigation device on the earth. The subset of neighboring satellites with respect to a specific satellite is determined by averaging over a period of the inter-satellite distance. The subsets are further restricted to the condition that all visible satellites are referenced by the position data of at least one other satellite. This requirement can be met by choosing appropriate permutations among the satellites with shortest distance.

15 Claims, 4 Drawing Sheets

Period of reduced almanacs

OTHER PUBLICATIONS

Misra, P. and Enge, P. Global Positioning System—Signals, Measurements, and Performance Ganga-Jamuna Press, 2nd ed., 2004; 4 pages.

Navstar, "GPS Standard Positioning Service: Signal Specification", available online: www.navcen.uscg.gov/pubs/gps/sigspec, 2nd edition, Jun. 2, 1995; 51 pages.

International Search Report; PCT/EP2007/056781; Oct. 16, 2007; 2 pages.

Wullems, C.; Pozzobon, O. and Kubik, K.: "Signal Authentication and Integrity Schemes for Next Generation Global Navigation Satellite Systems", European Navigation Conference GNSS, Jul. 2005, Munich, Germany; 10 pages.

* cited by examiner

Period of reduced almanacs

METHOD FOR TRANSMITTING SATELLITE DATA

CROSS-REFERENCE TO RELATED APPLICATIONS

The present application is a continuation of pending International patent application PCT/EP2007/056781 filed on Jul. 4, 2007, which designates the United States and claims priority from German patent application 10 2006 031 236.8 filed on Jul. 6, 2006, the content of which is incorporated herein by reference.

FIELD OF THE INVENTION

The invention relates to a method for transmitting satellite data of a global navigation satellite system in which position data of satellites of the global navigation satellite system are transmitted to a navigation device.

BACKGROUND OF THE INVENTION

Such a method is known from US 2005/0015200 A1. The known method is used to transmit satellite data from the satellites to the navigation device. The satellite data contain the information needed for a navigation device to determine its own position. The information is distributed in so-called navigation messages. The navigations messages contain almanacs with information on the clock and orbit of the other satellites. The known method includes steps for transmitting almanac data from a base station to a navigation device by a wireless connection between the base station and the navigation device. The base station receives a complete set of almanacs from a data source in the internet or from a receiver for the global positioning system. The base station then creates a subset of the complete set of satellite almanacs. The selection of the subset depends on the position of the navigation device. Finally, the subset of the current satellite almanac is transmitted from the server to the wireless device. According to the known method, a subset of the complete set of almanacs comprises the almanac data of the satellites, which are not in view of the navigation device. Additionally the more accurate ephemeris data for one or more satellites that are in view might be transmitted.

An almanac should be understood as a set of clock and orbital data of reduced precision of a single satellite. According to NAVSTAR, "GPS Standard Positioning Service: Signal Specification", available online: www.navcen.uscg.gov/pubs/gps/sigspec, 2nd ed., June 1995, the almanac data are contained in the 25 pages of the navigation message. The almanac data for the i-th satellite are implemented in the fourth and fifth subframe of the i-th page. The transmission of one page takes 30 seconds resulting in a total transmission time of 12.5 minutes for the fundamental Global Positioning System (=GPS) constellation with 24 satellites.

One purpose of the almanac is to initialize signal acquisition when a new satellite rises above the horizon and the user position is known. The second purpose of the almanac is to accelerate the signal acquisition of a warm start. The warm start is an acquisition mode that is based on a priori information of the last user position, the receiver clock time and the complete set of almanacs such that the search of the code delay $\Delta\tau$ and the Doppler shift $\Delta f_d$ of a specific satellite is significantly simplified.

A cold start is defined by a signal acquisition without any a priori information. The signal acquisition of the first satellite is generally very time consuming as the search space ($\Delta\tau, \Delta f_d$) is very large. After acquisition and carrier tracking, the navigation message is demodulated and the almanac is read. This information is of fundamental importance for the signal acquisition of further satellites.

The transmission of a complete set of almanacs by all satellites has the disadvantage that the time of a cold start can be quiet long. Therefore, the known method disclosed in US 2005/0015200 A1 reduces the redundancy of the almanac broadcast by selecting a subset of the almanac data that is actually needed by the navigation device. However, the known method presumes a wireless connection between the navigation device and the base station. This implies that the navigation device is provided with a receiver for a mobile network. Finally, the base station must send specific messages to the navigation devices depending on its position, which increases the system load of the mobile network.

U.S. Pat. No. 6,671,620 B1 discloses a further method for providing almanac data to a navigation device. In the known method the navigation device receives its rough position from a base station. The navigation device determines a list of visible satellites based on the rough position and the available almanac data. Finally, the navigation device transmits a list of visible satellites to the base station and requests the missing almanac data from the base station.

U.S. Pat. No. 4,445,118 proposes a navigation system based on a constellation of orbiting satellites. In the navigation system an acquisition-aiding signal generated by an earth-based control station is relayed to a navigation device via a geostationary satellite. The aiding signal contains almanac data. For transmitting the acquisition-aiding signal a frequency channel adjacent to one of the frequency channels used for the carrier signals of the navigation signals is used so that there is only little interference with the adjacent frequency channel of the carrier signal. Due to the narrow frequency separation between the acquisition-aiding signal and the adjacent carrier signal the carrier signal and the acquisition-aiding signal can be received by the same antenna and receiver.

WULLEMS, C.; POZZOBON, O. and KUBIK, K.: Signal Authentication and Integrity Schemes for Next Generation Global Navigation Satellite Systems, European Navigation Conference GNSS, July 2005, Munich, Germany discloses methods for the authentication of satellites.

An overview over global positioning systems can be found in MISRA, P. and ENGE, P. Global Positioning System—Signals, Measurements, and Performance Ganga-Jamuna Press, 2nd ed., 2004.

Proceeding from this related art the present invention seeks to provide an improved method for transmitting position data from satellites to a navigation device.

SUMMARY OF THE INVENTION

This object is achieved by a method having the features of the independent claim. Further advantages, embodiment and refinements are specified in the claims dependent thereon.

In the method, position data of a subset of satellites associated with a specific satellite are transmitted to the navigation device by the specific satellite. The subset of satellites contains a selection of these satellites whose average distance with respect to a period of the distance is shortest. In consequence not the complete set of position data is transmitted but the specific satellite transmits only information on these satellites which are most probably in the vicinity of the specific satellite and therefore also visible. As the distances between satellites depend on time the optimum set of position data for a specific satellite would change over time. Therefore, the selection of position data transmitted by the specific satellite is based on distances averaged over a period of the distances between the specific satellite and another satellite. Since the satellites move on orbits having the same time period, the period of the distance equals half the time of circulation of the satellites. By averaging over a period of the distance the satellites can be found whose mean distance with respect to the specific satellite is shortest. Minimizing the distances between two satellites corresponds to a search for a pair of satellites which are both visible from as many user positions as possible. Therefore the probability is maximized that the satellites whose position data are transmitted by a specific satellite are visible together with the specific satellite. In consequence, the redundancy in the transmitted date is effectively reduced since only data relevant for a specific satellite are transmitted. Thus, the amount of transmitted data can be considerably reduced.

There is another problem that constrains the minimization of the required number of almanacs. The search for these satellites, that are on the average closest to a specific satellite, does not guarantee that each visible satellite transmits the almanac of at least one other visible satellite. Due to the consideration of time averaged instead of time-dependent almanacs groups of visible satellites might appear, which refer only to members of the same group.

Therefore, the subset of almanacs transmitted by specific satellites contains also almanacs of satellites whose distance to the specific satellite is longer than the distance of satellites whose almanac is not contained in the selected subset of satellites. It has been found that such a selection results in subsets of almanacs which are free from groups referencing only satellites contained in the same group.

Preferably, the satellite data transmitted from the specific satellite to the navigation device are the data contained in almanacs, since the transmission of the almanac data is especially time consuming and determines the time needed for a cold start.

In particular, for the Galileo satellite navigation system subsets of the complete almanac data has been determined for all 27 satellites grouped in three orbits. It has been found that the six almanacs associated with the six satellites with the shortest distance to a specific satellite and the almanacs of the ninth and tenth satellites with shortest distance to the specific satellite should be chosen.

In particular, a minimum of eight time-invariant almanacs per satellite was found. These subsets are free of groups whose members reference only members of the same group.

The time saved in transmitting the subsets of almanacs might finally be used for cryptographic authentication services.

BRIEF DESCRIPTION OF THE DRAWINGS

Further advantages and properties of the present invention are disclosed in the following description, in which exemplary embodiments of the present invention are explained in detail on the basis of the drawing.

DETAILED DESCRIPTION OF THE INVENTION

Figure 1:
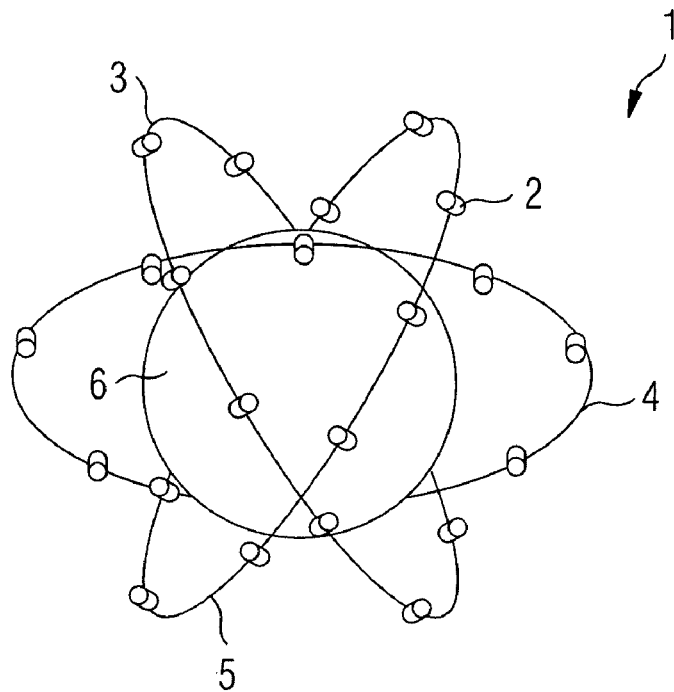
FIG. 1 is a perspective view of the orbits of a global navigation satellite system.

FIG. 1 is a perspective view of a global navigation satellite system 1 with satellites 2 grouped in obits 3, 4 and 5 around the earth 6. The satellites 2 are arranged in the so called ideal (27/3/1) Walker constellation proposed for Galileo in ZANDBERGEN, R.; DINWIDDY, S.; HAHN, J.; BREEUWER, E. and BLONSKI, D.: Galileo Orbit Selection, ION GNSS 17th International Technical Meeting of the Satellite Division, September 2004, Long Beach, Calif. In the following, the description is limited to the Galileo constellation although the method described herein might be equally applied to the Global Positioning System (=GPS).

The three orbits 3, 4 and 5 inclined by 56° have a radius of $r_s$=29600 km and a Right Ascension of the Ascending Node (RAAN) $\Omega^{(k)}$.

$$\Omega^{(k)} = 120° \cdot \left\lfloor \frac{k-1}{9} \right\rfloor \in \{0°, 120°, 240°\} \quad (1)$$

where k={1, 2, . . . , 27} denotes the index of the satellites 2 and $\lfloor z \rfloor$ represents the nearest integer which is equal or smaller than z. The argument of perigee is assumed to be ω=0° for all satellites 2. The true anomaly is given by $$v^{(\kappa)}(t) = v_{(0)}^{(\kappa)} + 2\pi \cdot \frac{t}{T_S} \quad (2)$$

with the satellite orbit period $T_S$ and the initial true anomaly $$v_0^{(\kappa)} = \frac{40°}{3} \cdot \left\lfloor \frac{\kappa-1}{9} \right\rfloor + 40° \cdot \left( \kappa - 1 - 9 \cdot \left\lfloor \frac{\kappa-1}{9} \right\rfloor \right) \quad (3)$$

Equivalently, the satellite index k can be expressed as a function of the initial true anomaly $v_0^{(k)}$ and the RAAN $\Omega^{(k)}$:

$$k = 1 + \left\lfloor \frac{v_0^{(\kappa)}}{40°} \right\rfloor + 9 \cdot \frac{\Omega^{(k)}}{120°} \quad (4)$$

For selecting subsets of the almanacs it has to be clarified how many almanacs are sufficient for the navigation message of each satellite 2 and which almanacs should be selected for each satellite 2. Furthermore, the optimum order of almanacs for each satellite 2 has to be determined.

For illustrating the complexity of the problem a brute-force approach shall be considered.

There exist 26 possibilities for the number L of almanacs transmitted by a specific satellite 2 if the specific satellite 2 needs not to transmit its own almanac. For each specific satellite 2, the number of different subsets containing L almanacs is:

$$\binom{26}{L}.$$

Assuming independent subsets of almanacs for each satellite 2, the number of different subsets, which can be assigned to the satellites 2 amounts to:

$$\binom{26}{L}^{27}.$$

Once the subsets of almanacs for all satellites are fixed, there exist L! different permutations for each subset resulting in $(L!)^{27}$ different orders of almanacs for the given subsets of almanacs.

For example, the choice of L=8 almanacs per satellite 2 results in $1.70 \times 10^{167}$ different subsets of almanacs for the satellites 2 and, for all subsets, we have to take $2.23 \times 10^{124}$ permutations into account.

Obviously, a brute-force approach is impractical. Therefore, some optimization criteria are presented which are based on user-satellite and inter-satellite geometrical properties. The selection of the almanac subsets is a two-step procedure: In a first step, we assume that L satellites 2 in a subset will be sufficient and in a second step, we verify that any visible constellation of satellites 2 can be completely acquired with the reduced almanac data.

1. Maximum Likelihood Approach Based on Inter-Satellite Distances

Let us consider all possible user positions $X_u$ from which a fixed satellite 2 with index k at position $x^{(k)}(t)$ can be observed at time t. We search for the satellite 2 with index l at position $x^{(l)}(t)$ which can be seen from as many user positions as possible:

$$\max_l |\{x_u | \gamma(x_u, x^{(l)}(t)) > \alpha \wedge \gamma(x_u, x^{(k)}(t)) > \alpha\}| \quad (5)$$

where $\gamma(x_u, x^{(k)}(t))$ denotes the elevation angle of the satellite with index k from $x_u$ and $\alpha$ the elevation angle of the elevation mask.

Figure 2:
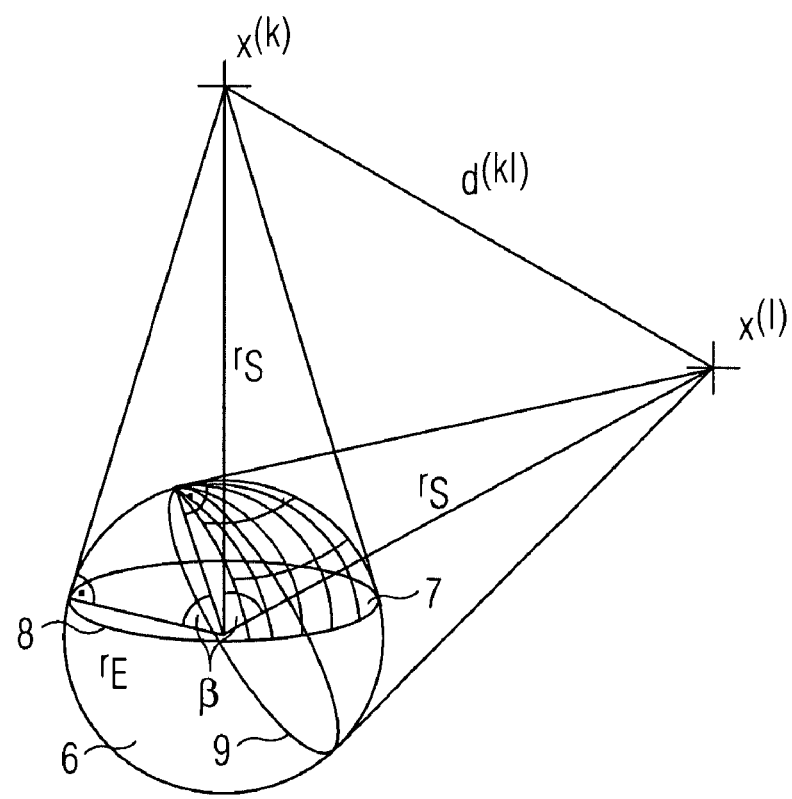
FIG. 2 illustrates the criterion of the nearest neighbors used in the search for satellites associated with a specific satellite.

Equation (5) maximizes an intersection area 7 of the Spherical calottes which represent visibility regions 8 and 9 of the two satellites 2 at the positions $x^{(l)}$ and $x(k)$ in FIG. 2. This is equivalent to the selection of the satellite 2 at position $x^{(l)}$ with minimum distance to the specific satellite 2 at position $x(k)$.

If the consideration illustrated in FIG. 2 is generalized to L almanac per satellite 2 the L nearest satellites at a time t must be found.

Inter-satellite distances are independent of the rotation of the earth 6 so that we define the position of satellite k in an earth centered but not earth fixed coordinate system as $$x^k(t) = R_3(-\Omega^{(k)}) R_1(-i) \begin{bmatrix} r_s \cos(\upsilon^{(k)}(t)) \\ r_s \sin(\upsilon^{(k)}(t)) \\ 0 \end{bmatrix} \quad (6)$$

where i=56° denotes the inclination angle of all satellites 2. The rotation matrices are defined as:

$$R_1(\theta) = \begin{bmatrix} 1 & 0 & 0 \\ 0 & \cos(\theta) & \sin(\theta) \\ 0 & -\sin(\theta) & \cos(\theta) \end{bmatrix} \quad (7)$$

and $$R_3(\theta) = \begin{bmatrix} \cos(\theta) & \sin(\theta) & 0 \\ -\sin(\theta) & \cos(\theta) & 0 \\ 0 & 0 & 1 \end{bmatrix} \quad (8)$$

with the rotation angle $\theta$. The inter-satellite distance between satellites k and l is obtained from equation (6)

$$d^{(k,l)}(t) = \|x^k(t) - x^l(t)\| \quad (9)$$

Let us determine the period of $d^{(k,l)}$: From Newton's law of universal gravitation, the orbit period of the satellites 2 can be derived to:

$$T_S = \sqrt{4\pi^2 \frac{r_S^3}{Gm_E}} \quad (10)$$

where G and $m_E$ denote the gravitational constant and the mass of the earth 6 and $r_S$ the radius of the orbit. All satellites 2 are in the opposite position of their orbit after a half cycle. This results in a repetition of the inter-satellite distances after $$T_d = \frac{1}{2} \cdot T_S \approx 7.04 h. \quad (11)$$

Figure 3:
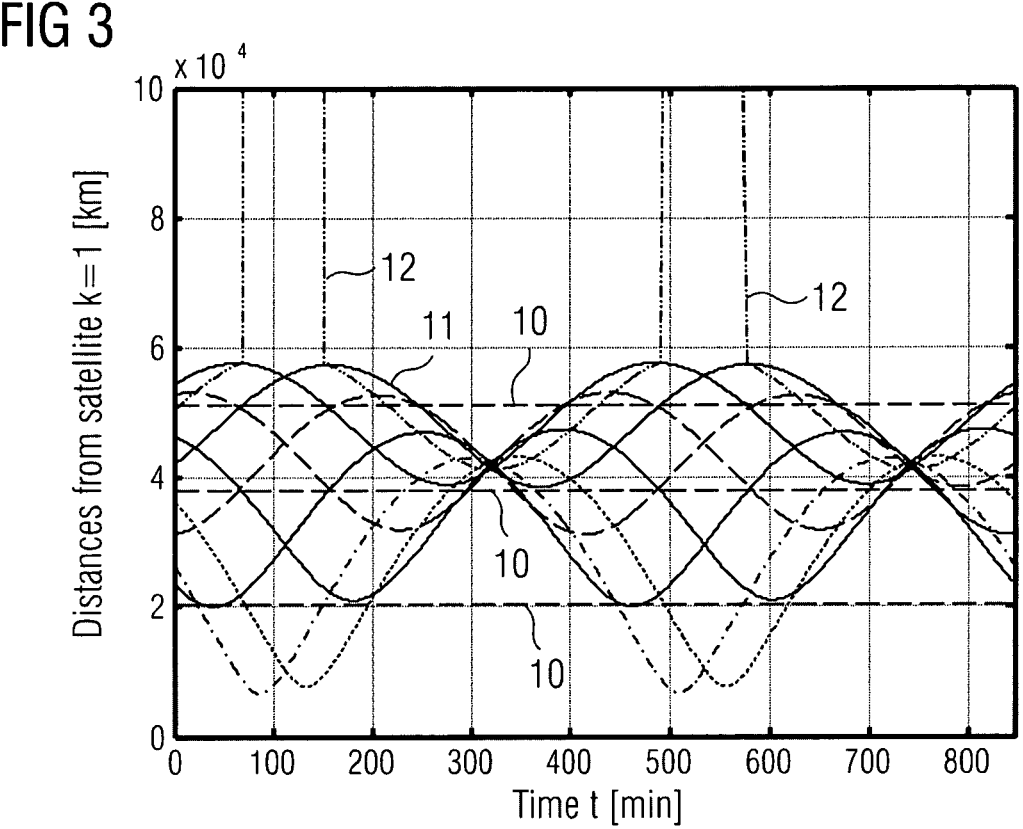
FIG. 3 shows the distance between the specific satellite and satellites of another first orbit in dependency of time.
Figure 4:
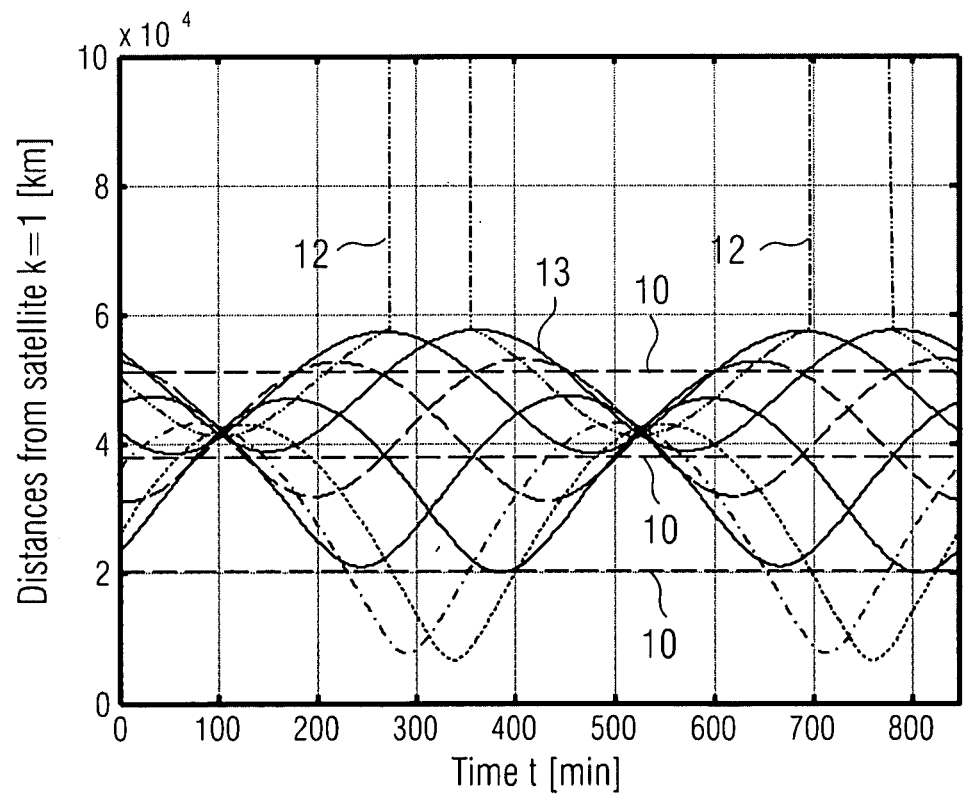
FIG. 4 shows the distance between the specific satellite and satellites of another second orbit in dependency of time.

The time dependency of the distance between satellites is illustrated in FIGS. 3 and 4.

FIG. 3 shows the time dependency of the distances between the satellite 2 with index k=1 of orbit 3 and other satellites 2 of orbit 4. FIG. 3 contains also the time independent distance of the satellites 2 of the same orbit 3 depicted by straight lines 10. Each of the straight lines 10 describes the distance towards two satellites 2 since the remaining two satellites 2 are covered by the earth 6 and are therefore invisible from the specific satellite 2 with index k=1. The eight curves 11 illustrate the time dependency of the distance with respect to the satellites 2 of orbit 4. There are only eight curves since one of the satellites 2 of orbit 4 is not visible from the specific satellite 2. Another satellite 2 is temporarily invisible which is indicated by a rectangular course 12 of the curve 11 associated with this satellite 2.

Similarly, FIG. 4 shows the time dependency of the distances between the satellite 2 with index k=1 of orbit 3 and the satellites 2 within orbit 5. The straight lines 11 indicate the time dependency of the distance towards the satellites 2 of the same orbit 3 whereas curves 13 depict the time dependency of the distances towards the satellites 2 of orbit 5.

In summary there exist two satellites 2 in orbit 4 and 5 that are never visible and two further satellites 2 that are seen only occasionally with one interruption in $T_d$.

FIGS. 3 and 4 also illustrate that the set of L nearest satellites of the k=1 satellite changes frequently over time. For instance, selecting the L=8 nearest satellites 2 of the satellite 2 with k=1 means 50 changes of the almanac per day. This makes the maximum likelihood approach uninteresting for practical implementations.

2. Almanac Selection Based on Time-Averaged Inter-Satellite Distances

Therefore, another approach has been investigated by considering time averaged inter-satellite distances to overcome the problem of frequently changing subsets of almanacs.

The almanacs of satellite 2 with index k consist of a set of L distinct almanacs of satellites 2 which are obtained from:

$$\min_{\substack{s \\ dim(s)=L}} = \sum_{\substack{l \in s \\ l \neq k}} \overline{d}^{(kl)} \quad (12)$$

$$= \min_{\substack{s \\ dim(s)=L}} \sum_{\substack{l \in s \\ l \neq k}} \frac{1}{T_d} \int_0^{T_d} d^{(kl)} \, dt$$

The almanac information of satellite 2 with index k is restricted to permanently visible satellites 2. Thus the inter-satellite distance is upper bounded by $$d^{(kl)}(t) \stackrel{!}{<} 2\sqrt{r_S^2 - r_E^2} \approx 57815 \text{ km} \quad (13)$$

Note that all satellites 2 travel on ground tracks from west to east so that some pairs of satellites 2 have always considerably larger distances than other ones.

The result of the optimization according to equation (12) is listed in Table I which shows the neighbors of each satellite 2 sorted according to the mean inter-satellite distances in an increasing order. Once all almanac subsets have been determined, it must be verified that any visible constellation can be completely acquired for any initially acquired satellite.

3. Verification of Visibility of Satellites:

The subset of almanacs should be selected such that any visible set of satellites 2 can be completely acquired. This requires that each visible satellite 2 is announced by at least one further visible satellite 2 at any time from any point on the earth 6.

The sets of visible satellites 2 have been determined numerically from a spatio-temporal grid of 10 degrees and 10 seconds. The spatial grid is based on an Earth Centered Earth Fixed (=ECEF) coordinate system.

Due to the rotation of the earth 6 a transformation of the satellite position into the ECEF coordinate system is required.

$$x_{ECEF}^{(k)} = R_3(\theta(t)) \cdot x^{(k)} \quad (14)$$

with the earth rotation angle $$\theta(t) = \frac{t}{T_E} \cdot 2\pi \quad (15)$$

A grid point on the ground $x_{u,ECEF}$ is determined by its longitude $\lambda_x$ and latitude $\lambda_y$ or, equivalently, by $$x_{u,ECEF} = r_E \cdot \begin{bmatrix} \cos(\lambda_y)\cos(\lambda_x) \\ \cos(\lambda_y)\sin(\lambda_x) \\ \sin(\lambda_y) \end{bmatrix} \quad (16)$$

The user-satellite distance is then defined as $$d(\lambda_x, \lambda_y, k, t) = \|x_{u,ECEF}(\lambda_x, \lambda_y) - x_{ECEF}{}^{(k)}(t)\| \quad (17)$$

and used to verify the visibility of satellite 2 with index k from the user at $x_{u,ECEF}(\lambda_x,\lambda_y)$ by verifying whether the elevation angle γ of a satellite 2 with index k is above the elevation angle L of the elevation mask.

$$\gamma(\lambda_x, \lambda_y, k, t) = a\cos\left(\frac{r_E^2 + d(\lambda_x, \lambda_y, k, t)^2 - r_S^2}{2 r_E r_S}\right) > \alpha \quad (18)$$

It has been found that, a visible satellite 2 might not be announced by another one from the set of visible satellites 2. This is caused by the time-variant inter-satellite distances which differ occasionally from the averaged distances. Accordingly, there exist groups in the subsets of almanacs. The members of these groups only refer to the members of the same groups and not to external members. For avoiding this drawback a third approach has been used.

4. Almanac Selection Based on Permutation of the Satellite Neighbor Matrix

In the third approach the search method is based on the result of the previous optimization, in particular on the sorting of the satellites 2 in matrix S according to their mean inter-satellite distances (Table I). In contrast to the previous approach, in which the L nearest satellites 2 have been selected a permutation p of L columns of S is searched such that any visible satellite 2 is always announced by the almanac of at least one other visible satellite 2. Accordingly, a constraint is imposed on the subsets to prevent an empty set as a result of an intersection between a visible satellite 2 with index k and the almanacs of all other visible satellites 2:

$$\min_p L \text{ s.t.} \bigcup_{\substack{i \in c \\ i \neq k}} \bigcup_{\substack{j \in p \\ dim(p)=L}} \bigcap (S[i,j], k) \neq \phi \, \forall \, k \in c, c, \alpha \quad (19)$$

where φ denotes the empty set, c a set of visible satellites and ∩(S[i, j], k) the intersection of S[i, j] and k. Equation (19) means that the permutation is chosen such that L is minimized subject to (=s. t.) the condition that a visible satellite with index k=l is contained in at least one other subset of visible satellites. The optimization according to equation (19) can also be rewritten as:

$$\min_p L \text{ s.t.} \bigcap_\alpha \bigcap_c \bigcap_{k \in c} \bigcup_{\substack{i \in c \\ i \neq k}} \bigcup_{\substack{j \in p \\ |p|=L}} \bigcap (S[i,j], k) \neq \phi \quad (20)$$

Since each Galileo satellite 2 has a permanent line of sight to 22 other Galileo satellites 2, $$\binom{22}{L}$$

permutations of p have to be considered.

As in the previous approach L=8 was obtained as minimum almanac length. For this result, 319770 different almanac constellations were tested for each of the elevation masks with elevation angle α={0°, 5°, . . . , 30°}. The optimum permutation is given by p=[1, 2, 3, 4, 5, 6, 9, 10], thus the six nearest and the ninth and tenth nearest satellites are suggested for the subsets of almanacs of each satellite 2 reducing the length of the almanac to L=8 compared to 27 of the actual specification of the navigation message.

Table II shows, that increasing the elevation angle of the elevation mask from α=0° to α=30° has two effects: On the one hand, the number $N_c$ of sets of visible satellites 2 is reduced but on the other hand, the number of visible satellites 2 per subset is halved which is a critical issue concerning the subsets. As the average set size of visible satellites $E\{|c|\}$ is lowered much more than the number of sets is reduced, the bottleneck of the optimization according to equation (20) is at elevation masks with high elevation angles (L=30°).

5. Acquisition Time of Cold Start with Reduced Almanac

In a cold start no ephemeris nor almanac data are available for signal acquisition.

The signal acquisition is split into three parts: First, an initial satellite 2 with index $k_i$ is acquired without any almanac data in $T_{acq}^-$. Afterwards, the set of almanacs of the satellite 2 with index $k_i$ is read which lasts for $T_A$ per almanac. As soon as one almanac of a visible satellite 2 has been received completely, a signal acquisition of this satellite is started and takes $T_{acq}^+$ with $T_{acq}^+ < T_{acq}^-$ due to the almanac information obtained from the first satellite 2. The number K of serially read almanacs for acquisition of the whole visible constellation of satellite 2 depends on the set of visible satellites c, the initial satellite $k_i$, the elevation mask α and the set length L. The number M of serial signal acquisitions with almanac information also depends on c, $k_i$, α and L. The total acquisition time is thus given by $$T_{acq} = T_{acq}^- + K(c, k_i, \alpha, L) \cdot T_A + M(c, k_i, \alpha, L) \cdot T_{acq}^+ \quad (21)$$

where the set c of visible satellites is a function of the user location $X_u$ and the time t. Note that not every signal acquisition plays a role in $T_{acq}$, due to parallel almanac processing.

Figure 5:
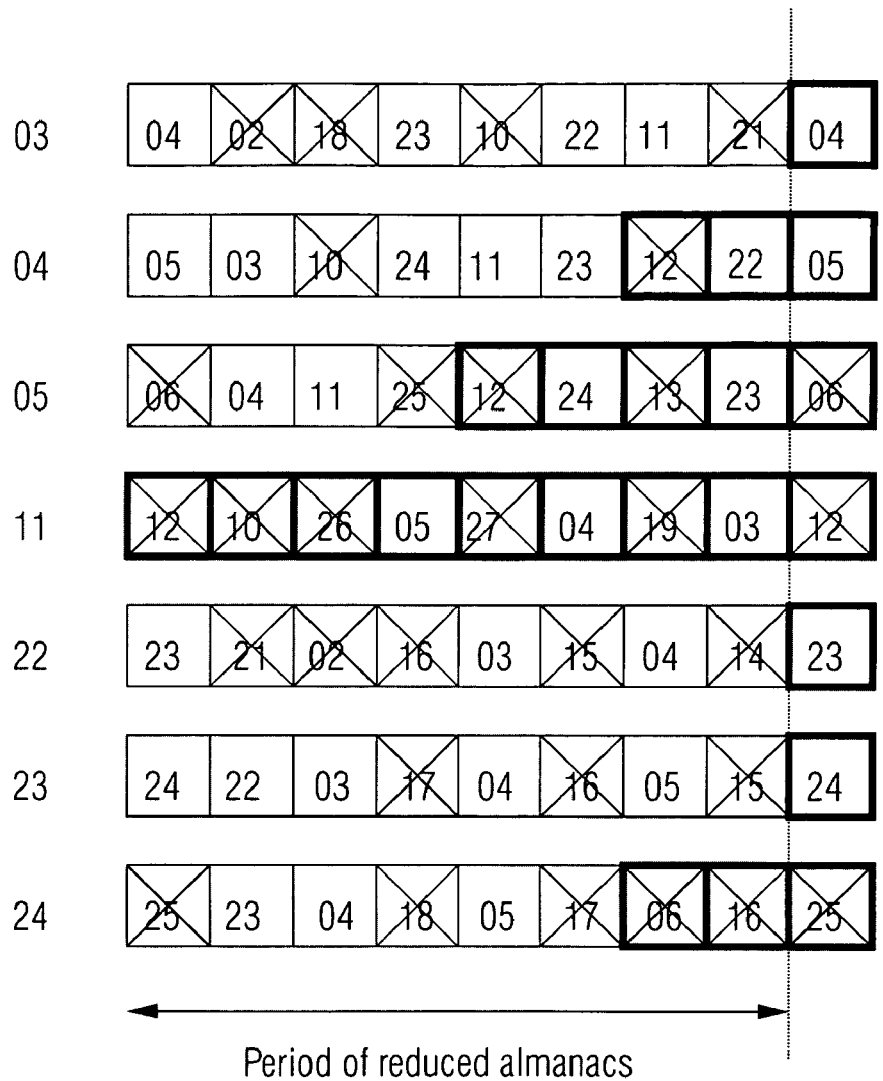
FIG. 5 illustrates an acquisition process for almanac data.
Figure 6:
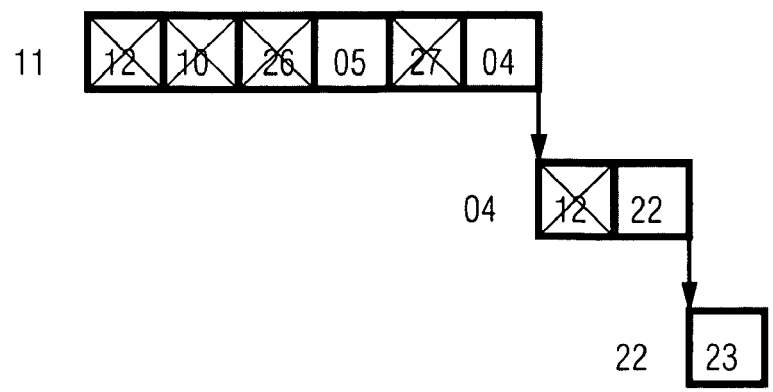
FIG. 6 illustrates the course of the acquisition process.

FIGS. 5 and 6 illustrate an example of the acquisition process of the navigation device on the earth 6. In FIGS. 5 and 6 the indices of invisible satellites 2 have been crossed out. The framed indices are the indices of the satellites 2 whose almanacs have been actually read out.

According to FIG. 5 the acquisition process starts with satellite 2 with index $k_i$=11, which is the first satellite 2 which has been detected by the navigation device. The almanac of satellite 2 with index k=12 is then read out. Unfortunately, satellite 2 with index k=12 is invisible. Subsequently, the navigation device obtains the almanacs of satellites 2 with indices k=10, 26, 5. The almanac of satellite 2 with index k=5 is the first satellite 2 which is visible for the navigation device. Therefore, the navigation device can find satellite 2 with index k=5 and can read the almanac of satellite 2 with index k=12, which is invisible. In the next transmission period of almanacs, satellite 2 with almanacs $k_i$=11 transmits the almanac of the visible satellite 2 with index k=4, and satellite 2 with index k=5 transmits the almanac of visible satellite 2 with index k=24. At this point, the navigation device is capable of detecting satellites 2 with indexes k=4 and k=24. In the next period of the transmission of the almanacs no additional satellites 2 can be found since the almanacs transmitted by the satellites 2 with indexes $k_i$=11 and k=4, 5 and 24 concern invisible satellites. However, in the next period of the almanac transmission satellite 2 with index k=4 transmits the almanac of satellite 2 with index k=22, satellite 2 with index k=5 transmits the almanac of satellite 2 with index k=23 and satellite 2 with index k=11 transmits almanac of satellite 2 with index k=3, so that after eight steps of transmitting almanacs all visible satellites 2 with indices 3, 4, 5, 11, 22, 23 and 24 have been found.

It should be noted that the time for an almanac based acquisition $T_{acq}^+$ is much shorter than the transmission time of an almanac. The position data transmitted by a further satellite 2 can be extracted in the present period of the almanac transmission since the relevant position data are generally not contained in the beginning of the navigation message. In the case of GPS, the almanac data are transmitted in the fourth and fifth subframe of each page which is equivalent with the 30 seconds frame.

Table III demonstrates the influence of α on the optimization according to equation (20). Table III contains the average number of serially read almanacs $E_c\{E_{ki}\{K\}\}$ and acquisition processes $E_c\{E_i\{M\}\}$ for the reduced and full almanac. The input parameters for the computation of these almanac acquisition statistics are all possible sets of visible satellites, which have been derived in the previous section, and the reduced almanacs (S, p).

The optimized almanac sets reduce the required number of serially read almanacs by a factor 2.6. The number of acquisition processes is increased but its duration is much smaller than the reading of one almanac in $T_A$.

Figure 7:
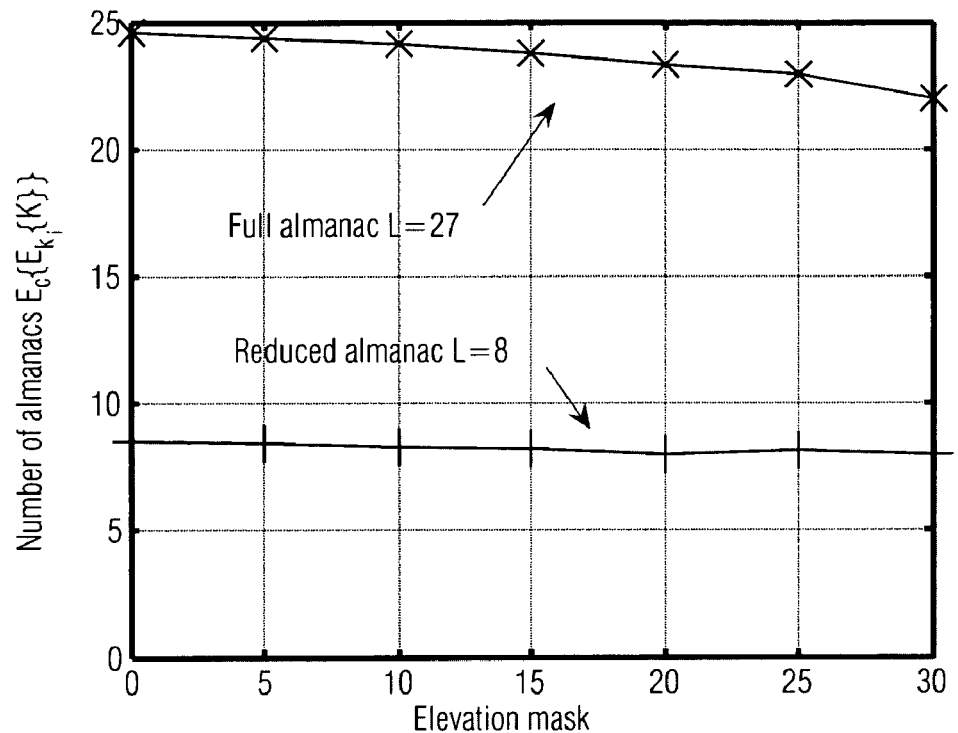
FIG. 7 is a diagram containing the mean number of acquisition steps needed for determining all visible satellites in dependency of the elevation angle of an elevation mask.

FIG. 7 shows the average number of read almanacs $E_c\{E_{ki}\{K(c, k_i, \alpha, L)\}\}$ as a function of the elevation angle of the elevation mask α. Increasing α reduces the number of visible satellites 2 and, thus, shortens the acquisition process.

Figure 8:
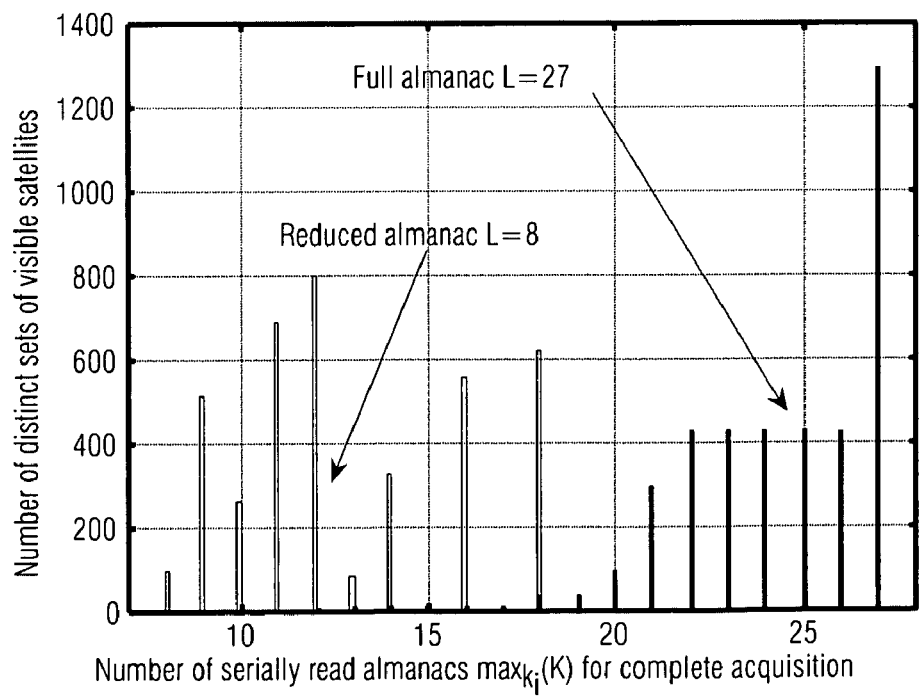
FIG. 8 is a diagram depicting the number of almanac sets with a given number of acquisition steps.

The histogram of the number of serially read almanacs for complete acquisition in FIG. 8 visualizes the dependency of the acquisition time $T_{acq}$ on the current set of visible satellites c. For the histogram in FIG. 8 the worst-case initial satellite 2 with index $k_i$ of each set has been considered, or $\max_{ki}(K(c, k_i, \alpha, L))$. In this case, the initial satellite 2 usually moves slightly above the horizon. If the reduced almanac rather than the full almanac is used, a stronger impact of $k_i$ on $T_{acq}$ can be observed.

The fact that all 27 satellites have to be read in about one third of the cases, if the full almanac information is used, can be explained as following. In our scenario, the average set size is given by $|c| \approx 9$ (Table II). We assume that one satellite of the set of visible satellites corresponds to the last one of the full almanac (worst case assumption) and the other $|c|-1$ visible satellites are uniformly distributed in the full almanac except the last position. The probability of these sets is given by $$P = \frac{\binom{27-1}{|c|-1}}{\binom{27}{|c|}} = 1/3 \quad (22)$$

and fits very well to the simulation results which indicate a complete reading of the full almanac in $$\frac{1291}{3939} \approx 32.8\%$$

of all possible sets of visible satellites.

The method described herein simplifies the navigation message by reducing the number of almanacs per satellite. The almanacs of the navigation message have been chosen taking the time averaged inter-satellite distances into account: Each satellite 2 announces a selection of its nearest neighbors so that the probability of simultaneous visibility of both the announcing and announced satellites 2 from the earth 6 is maximized.

It has been shown that the optimized almanac information shortens the acquisition time of a cold start by a factor of 2.6. The time saved for the transmission of the navigation message might be used for additional services such as authentication of the satellites.

The method described herein can be applied to any global satellite navigation system such as GPS, GLONASS or Galileo or other present or future satellite navigation system.

of the global navigation satellite system are transmitted to a navigation device, wherein the position data of a subset of satellites associated with a specific satellite are transmitted to the navigation device by the specific satellite and wherein the subset of satellites contains a selection of those satellites, whose distance with respect to the specific satellite, averaged over a repetition period of the inter-satellite distance, is shortest.

TABLE I

Reduced almanacs and sorting of satellites according to time-averaged inter-satellite distances

| k | The neighbor matrix S: Sorting of satellites with respect to $E\{d^{(kl)}(t)\}$ | | | | | | | | | | | | | | | | | | | | | | | | | | |
|---|---|---|---|---|---|---|---|---|---|---|---|---|---|---|---|---|---|---|---|---|---|---|---|---|---|---|
| 1 | 2 | 9 | 16 | 21 | 17 | 20 | 15 | 22 | 18 | 19 | 3 | 8 | 23 | 14 | 27 | 10 | 24 | 13 | 26 | 11 | 4 | 7 | | | | |
| 2 | 3 | 1 | 17 | 22 | 18 | 21 | 16 | 23 | 10 | 20 | 4 | 9 | 24 | 15 | 19 | 11 | 25 | 14 | 27 | 12 | 5 | 8 | | | | |
| 3 | 4 | 2 | 18 | 23 | 10 | 22 | 17 | 24 | 11 | 21 | 5 | 1 | 25 | 16 | 20 | 12 | 26 | 15 | 19 | 13 | 6 | 9 | | | | |
| 4 | 5 | 3 | 10 | 24 | 11 | 23 | 18 | 25 | 12 | 22 | 6 | 2 | 26 | 17 | 21 | 13 | 27 | 16 | 20 | 14 | 7 | 1 | | | | |
| 5 | 6 | 4 | 11 | 25 | 12 | 24 | 10 | 26 | 13 | 23 | 7 | 3 | 27 | 18 | 22 | 14 | 19 | 17 | 21 | 15 | 8 | 2 | | | | |
| 6 | 7 | 5 | 12 | 26 | 13 | 25 | 11 | 27 | 14 | 24 | 8 | 4 | 19 | 10 | 23 | 15 | 20 | 18 | 22 | 16 | 9 | 3 | | | | |
| 7 | 8 | 6 | 13 | 27 | 14 | 26 | 12 | 19 | 15 | 25 | 9 | 5 | 20 | 11 | 24 | 16 | 21 | 10 | 23 | 17 | 1 | 4 | | | | |
| 8 | 9 | 7 | 14 | 19 | 15 | 27 | 13 | 20 | 16 | 26 | 1 | 6 | 21 | 12 | 25 | 17 | 22 | 11 | 24 | 18 | 2 | 5 | | | | |
| 9 | 1 | 8 | 15 | 20 | 16 | 19 | 14 | 21 | 17 | 27 | 2 | 7 | 22 | 13 | 26 | 18 | 23 | 12 | 25 | 10 | 3 | 6 | | | | |
| 10 | 11 | 18 | 25 | 4 | 26 | 3 | 24 | 5 | 27 | 2 | 12 | 17 | 6 | 23 | 1 | 19 | 7 | 22 | 9 | 20 | 13 | 16 | | | | |
| 11 | 12 | 10 | 26 | 5 | 27 | 4 | 25 | 6 | 19 | 3 | 13 | 18 | 7 | 24 | 2 | 20 | 8 | 23 | 1 | 21 | 14 | 17 | | | | |
| 12 | 13 | 11 | 27 | 6 | 19 | 5 | 26 | 7 | 20 | 4 | 14 | 10 | 8 | 25 | 3 | 21 | 9 | 24 | 2 | 22 | 15 | 18 | | | | |
| 13 | 14 | 12 | 19 | 7 | 20 | 6 | 27 | 8 | 21 | 5 | 15 | 11 | 9 | 26 | 4 | 22 | 1 | 25 | 3 | 23 | 16 | 10 | | | | |
| 14 | 15 | 13 | 20 | 8 | 21 | 7 | 19 | 9 | 22 | 6 | 16 | 12 | 1 | 27 | 5 | 23 | 2 | 26 | 4 | 24 | 17 | 11 | | | | |
| 15 | 16 | 14 | 21 | 9 | 22 | 8 | 20 | 1 | 23 | 7 | 17 | 13 | 2 | 19 | 6 | 24 | 3 | 27 | 5 | 25 | 18 | 12 | | | | |
| 16 | 17 | 15 | 22 | 1 | 23 | 9 | 21 | 2 | 24 | 8 | 18 | 14 | 3 | 20 | 7 | 25 | 4 | 19 | 6 | 26 | 10 | 13 | | | | |
| 17 | 18 | 16 | 23 | 2 | 24 | 1 | 22 | 3 | 25 | 9 | 10 | 15 | 4 | 21 | 8 | 26 | 5 | 20 | 7 | 27 | 11 | 14 | | | | |
| 18 | 10 | 17 | 24 | 3 | 25 | 2 | 23 | 4 | 26 | 1 | 11 | 16 | 5 | 22 | 9 | 27 | 6 | 21 | 8 | 19 | 12 | 15 | | | | |
| 19 | 20 | 27 | 8 | 13 | 9 | 12 | 7 | 14 | 1 | 11 | 21 | 26 | 15 | 6 | 10 | 2 | 16 | 5 | 18 | 3 | 22 | 25 | | | | |
| 20 | 21 | 19 | 9 | 14 | 1 | 13 | 8 | 15 | 2 | 12 | 22 | 27 | 16 | 7 | 11 | 3 | 17 | 6 | 10 | 4 | 23 | 26 | | | | |
| 21 | 22 | 20 | 1 | 15 | 2 | 14 | 9 | 16 | 3 | 13 | 23 | 19 | 17 | 8 | 12 | 4 | 18 | 7 | 11 | 5 | 24 | 27 | | | | |
| 22 | 23 | 21 | 2 | 16 | 3 | 15 | 1 | 17 | 4 | 14 | 24 | 20 | 18 | 9 | 13 | 5 | 10 | 8 | 12 | 6 | 25 | 19 | | | | |
| 23 | 24 | 22 | 3 | 17 | 4 | 16 | 2 | 18 | 5 | 15 | 25 | 21 | 10 | 1 | 14 | 6 | 11 | 9 | 13 | 7 | 26 | 20 | | | | |
| 24 | 25 | 23 | 4 | 18 | 5 | 17 | 3 | 10 | 6 | 16 | 26 | 22 | 11 | 2 | 15 | 7 | 12 | 1 | 14 | 8 | 27 | 21 | | | | |
| 25 | 26 | 24 | 5 | 10 | 6 | 18 | 4 | 11 | 7 | 17 | 27 | 23 | 12 | 3 | 16 | 8 | 13 | 2 | 15 | 9 | 19 | 22 | | | | |
| 26 | 27 | 25 | 6 | 11 | 7 | 10 | 5 | 12 | 8 | 18 | 19 | 24 | 13 | 4 | 17 | 9 | 14 | 3 | 16 | 1 | 20 | 23 | | | | |
| 27 | 19 | 26 | 7 | 12 | 8 | 11 | 6 | 13 | 9 | 10 | 20 | 25 | 14 | 5 | 18 | 1 | 15 | 4 | 17 | 2 | 21 | 24 | | | | |

TABLE II

Number of distinct sets of visible satellites $N_c$ and average set size $E\{|c|\}$

| α | $N_C$ | $E\{|C|\}$ |
|---|---|---|
| 0° | 3927 | 9.7680 |
| 10° | 3939 | 8.8012 |
| 20° | 3168 | 6.5969 |
| 30° | 2434 | 4.9100 |

TABLE III

Comparison of acquisition time parameters for α = 0° and set length L = {8, 27}

| | L | |
|---|---|---|
| | 8 | 27 |
| $E_c\{E_{kj}\{K\}\}$ | 8.5153 | 24.56 |
| $E_c\{E_{kj}\{M\}\}$ | 2.5135 | 1.00 |

What is claimed is:

1. A method for transmitting satellite data for a global navigation satellite system, in which position data of satellites of the global navigation satellite system are transmitted to a navigation device, wherein the position data of a subset of satellites associated with a specific satellite are transmitted to the navigation device by the specific satellite and wherein the subset of satellites contains a selection of those satellites, whose distance with respect to the specific satellite, averaged over a repetition period of the inter-satellite distance, is shortest.

2. The method of claim 1, wherein the subset is free from groups of satellites, which transmit exclusively the position data of of other satellites the group.

3. The method of claim 1, wherein the set of position data transmitted by the specific satellite contains position data of satellites, which are farther away from the specific satellite than satellites, whose position data is not contained in the set of position data transmitted by the specific satellite.

4. The method of claim 1, wherein the satellites are arranged in the (27/3/1) Walker constellation and wherein the specific satellite transmits position data of the six nearest satellites and the ninth and tenth nearest satellite.

5. The method of claim 1, wherein the position data are contained in almanacs.

6. A global navigation satellite system comprising:
a navigation device,
a plurality of satellites arranged for transmitting position data to the navigation device,
a specific satellite arranged for transmitting the position data of a subset of satellites associated with the specific satellite to the navigation device,
wherein the subset of satellites contains a selection of those satellites, whose distance with respect to the specific satellite, averaged over a repetition period of the inter-satellite distance, is shortest.

7. The system of claim 6, wherein the subset is free from groups of satellites, which transmit exclusively the position data of other satellites of the group.

8. The system of claim 6, wherein the set of position data transmitted by the specific satellite contains position data of satellites, which are farther away from the specific satellite than satellites, whose position data is not contained in the set of position data transmitted by the specific satellite.

9. The system of claim 6, wherein the satellites are arranged in the (27/3/1) Walker constellation and wherein the specific satellite is arranged for transmitting position data of the six nearest satellites and the ninth and tenth nearest satellite.

10. The system of claim 6, wherein the position data are contain in almanacs.

11. A method for transmitting satellite data for a global navigation satellite system, in which position data of satellites of the global navigation satellite system are transmitted to a navigation device, wherein the position data of a subset of satellites I associated with a specific satellite k are transmitted to the navigation device by the specific satellite k and wherein the subset of satellites I contains a selection s of those satellites, whose distance with respect to the specific satellite k, averaged over a repetition period of the inter-satellite distance $d^{(kl)}$, is shortest, the selection being determined by an optimization according to:

$$\min_{\substack{s \\ dim(s)=L}} \sum_{\substack{l \in s \\ l \neq k}} \frac{1}{T_d} \int_0^{T_d} d^{(kl)}(t) \, dt$$

wherein L is a number smaller that the number of all satellites and $T_d$ is the orbit period of the satellites.

12. The method according to claim 11, wherein the subset is free from groups of satellites, which transmit exclusively the position data of other satellites of the group by imposing a constraint to the subset to prevent an empty set as a result of an intersection between the specific satellite and the satellites whose position data are transmitted by the satellites whose position data is transmitted by the specific satellite.

13. The method according to claim 11, wherein the set of position data transmitted by the specific satellite contains position data of satellites, which are farther away from the specific satellite than satellites, whose position data is not contained in the set of position data transmitted by the specific satellite.

14. The method according to claim 11, wherein the satellites are arranged in the (27/3/1) Walker constellation and wherein the specific satellite transmits position data of the six nearest satellites and the ninth and tenth nearest satellite.

15. The method according to claim 11, wherein the position data are contained in almanacs.

* * * * *